(12) United States Patent
Gulo et al.

(10) Patent No.: US 10,425,772 B2
(45) Date of Patent: *Sep. 24, 2019

(54) SELF-LEARNING LOCALIZATION DATA REPOSITORY

(71) Applicant: MAPSTED CORP., Mississauga (CA)

(72) Inventors: Eros Gulo, Woodbridge (CA); Sean Huberman, Guelph (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,164

(22) Filed: Feb. 19, 2019

(65) Prior Publication Data

US 2019/0182628 A1 Jun. 13, 2019

Related U.S. Application Data

(63) Continuation of application No. 15/827,853, filed on Nov. 30, 2017, now Pat. No. 10,257,658.

(51) Int. Cl.
*H04W 4/02* (2018.01)
*H04W 4/029* (2018.01)
*G01C 21/06* (2006.01)
*G01C 21/00* (2006.01)
*G01C 21/20* (2006.01)
(Continued)

(52) U.S. Cl.
CPC .......... *H04W 4/029* (2018.02); *G01C 21/005* (2013.01); *G01C 21/08* (2013.01); *G01C 21/206* (2013.01); *G06N 5/02* (2013.01); *H04W 4/023* (2013.01); *H04W 4/027* (2013.01)

(58) Field of Classification Search
CPC ...... H04W 4/029; H04W 4/023; G01C 21/08; G06N 5/02
See application file for complete search history.

(56) References Cited

U.S. PATENT DOCUMENTS 6,539,327 B1 * 3/2003 Dassot ................. G01V 3/081
702/150
2009/0043504 A1 2/2009 Bandyopadhyay et al.
(Continued)

OTHER PUBLICATIONS

Shao et al., "Location Fingerprint Extraction for Magnetic Field Magnitude Based Indoor Positioning", Journal of Sensors vol. 2016, Article ID 1945695, 16 pages http://dx.doi.org/10.1155/2016/1945695.*

*Primary Examiner* — Muthuswamy G Manoharan
(74) *Attorney, Agent, or Firm* — Henry L. Ohab (57) ABSTRACT

A method and system for automatically updating a self-learning data repository. The method is executed in a processor of a server computing device to store a fingerprint map of an area in the self-learning data repository, the fingerprint map having positioning fingerprint data that includes magnetic spatial derivative fingerprint data, receive, at the self-learning data repository, at least one of mobile device signal data and mobile device sensor data correlated with a sequence of positions along a trajectory describing a movement of a mobile device relative to the area, the sensor data including mobile device magnetic spatial derivative data, and automatically update, using the processor, the self-learning data repository by adding the at least one of mobile device signal data and mobile device sensor data to the positioning fingerprint data.

20 Claims, 4 Drawing Sheets

(51) Int. Cl.
    *G06N 5/02*     (2006.01)
    *G01C 21/08*    (2006.01)

(56)            References Cited

U.S. PATENT DOCUMENTS

2009/0248301  A1    10/2009  Judd et al.
2013/0150076  A1     6/2013  Kim et al.
2014/0018095  A1     1/2014  Parvizi et al.
2014/0320121  A1*   10/2014  Perttunen ............... G01C 21/08
                                                          324/244
2015/0163461  A1*    6/2015  Eustice .................. H04W 4/00
                                                           348/77
2016/0011022  A1     1/2016  Zheng et al.
2016/0379074  A1    12/2016  Nielsen et al.

* cited by examiner

SELF-LEARNING LOCALIZATION DATA REPOSITORY

CROSS-REFERENCE TO RELATED APPLICATION

This application claims the benefit of priority to U.S. application Ser. No. 15/827,853 filed 30 Nov. 2017. U.S. application Ser. No. 15/827,853 filed 30 Nov. 2017 is hereby incorporated in the entirety herein.

TECHNICAL FIELD

The disclosure herein relates to the field of mobile device navigation and positioning.

BACKGROUND

Users of mobile devices are increasingly using and depending upon indoor positioning and navigation applications and features. Seamless, accurate and dependable indoor positioning of a mobile device as carried or worn by a user can be difficult to achieve using satellite-based navigation systems when the latter becomes unavailable, or sporadically available, and therefore unreliable, such as within enclosed or partially enclosed urban infrastructure and buildings, including hospitals, shopping malls, airports, universities and industrial warehouses. Wireless communication signal data and magnetic field data may be measured to aid in localizing a mobile device along a route or trajectory being traversed. A mapping, or fingerprint map, of characteristic signatures from wireless signals and mobile device sensors correlated with unique positions along a trajectory describing a mobile device movement along a sequence of positions may be stored in a data repository, then accessed and applied to localize the device.

DETAILED DESCRIPTION

Embodiments herein provide for localizing a position of a mobile device at least in part based on calculating a spatial derivative magnetic fingerprint that corresponds and correlates to magnetic fingerprint data acquired at positions along a trajectory of the mobile device. A spatial derivative of magnetic field data, the magnetic field data including but not limited to magnetic field strength and direction, may be matched or compared to a pre-existing repository of reference spatial magnetic field data in order to determine a unique location, or position of, a mobile device traversing a route or trajectory in two- or three-dimensional space. The latter process of determining a unique location or position of the mobile device in two- or three-dimensional space is referred to herein as localizing the mobile device or mobile device localization.

Among other benefits and technical effects, it is recognized that different mobile devices, such as smartphones, commonly produce varying or different magnetic field measurements within a given magnetic field, including measurements of magnetic field strength, for example. While the values of parameters being measured by magnetometer sensor devices of different smartphones, for example magnetic field strength values might differ in absolute magnitude, the spatial patterns in variation of the separate absolute measurements present similar and comparable signatures. Reasons for variation in absolute values of magnetic measurements within a given magnetic field may be due to particular internal components used to build mobile devices, and also the particular external accessories (cases, covers, and other attachments) attached and deployed by a user to customize a smartphone. The inventors recognize that using spatial derivatives of magnetic field measurements, rather than absolute values of magnetic field measurements, allows for more effectively capturing a curvature, trend or pattern of the magnetic field during a spatial route traversal and provides basis for localizing a magnetic sensor-equipped mobile computing device in conjunction with a pre-calibrated or reference fingerprint map of an area that includes spatial derivatives of magnetic field data. Thus, using spatial derivatives enables assessment of the relative changes in magnetic field as a mobile device traverses particular locations or positions sequentially within an area, and provides a unique signature across individual mobile devices, even when those individual devices exhibit differing magnetic field absolute measurements. The inventors also recognize that mobile device trends or patterns of a magnetic field over a space or area being traversed may enable localization in a robust and repeatable manner across different phones which, while measuring significantly different magnetic field absolute values, may still exhibit a same, or significantly similar, magnetic field trend or pattern signature.

Also provided is a mobile device including a processor and a memory storing a set of computer instructions. The instructions are executable in the processor to monitor magnetic data acquired by the mobile device along a route being traversed, derive, from the mobile device magnetic data, a mobile device spatial derivative magnetic fingerprint along the route, access a repository of spatial derivative magnetic fingerprint data having associated respective positions along the route, and localize the mobile device based at least partly on matching the mobile device spatial derivative magnetic fingerprint with the spatial derivative magnetic fingerprint data of the repository.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components.

Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

Figure 1:
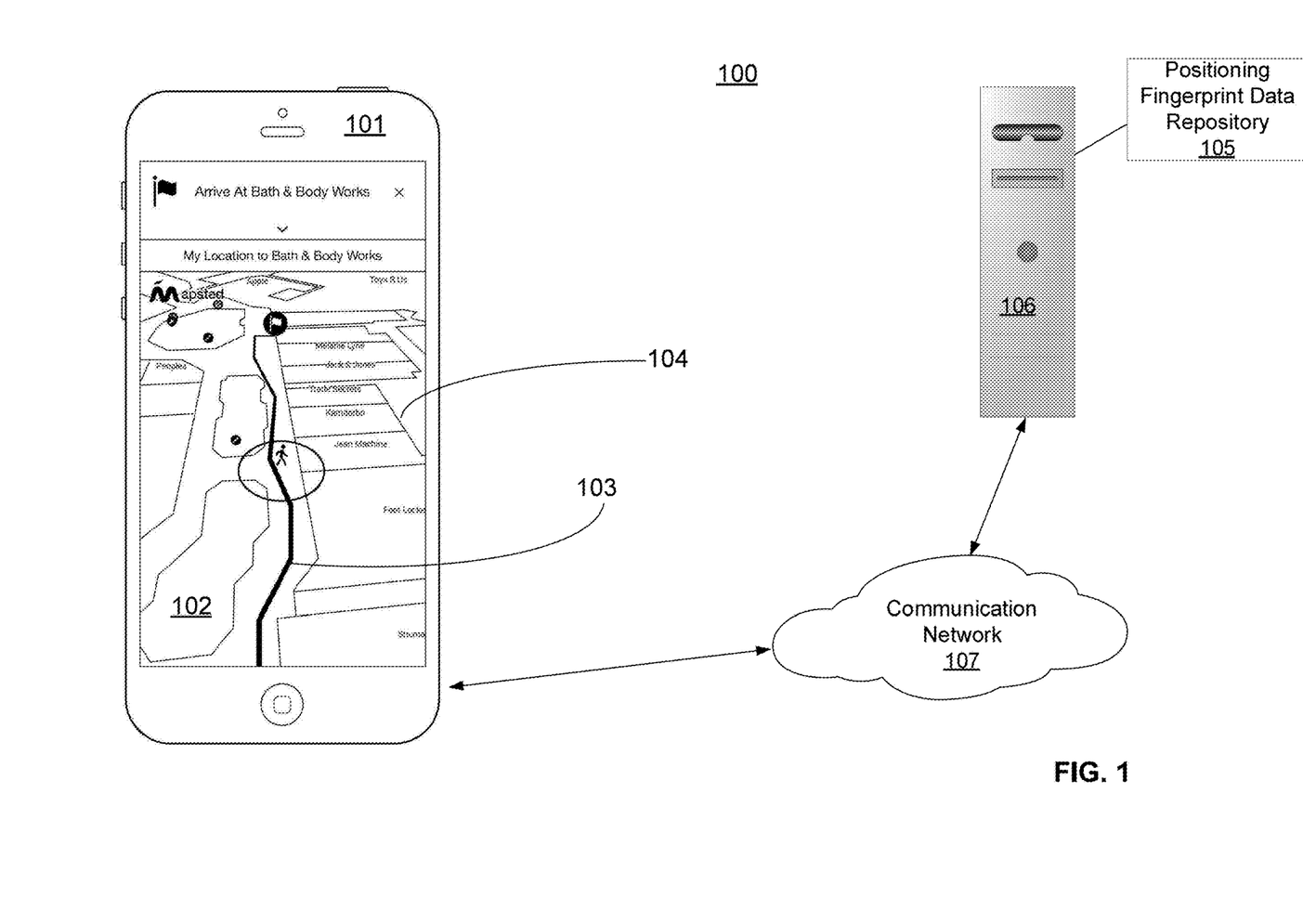
FIG. 1 illustrates, in an example embodiment, a self-learning data repository system for localizing a mobile device.

FIG. 1 illustrates, in an example embodiment, self-learning data repository 105, hosted at server computing device 106, for localizing mobile device 101. Mobile device 101 may be such as a cellular or smartphone, a laptop or a tablet computer, or a wearable computer device that may be operational for any one or more of telephony, messaging, and data computing. Mobile device 101 may be connected within a computer network system, including the internet or other wide area network, to one or more remote server computing devices. While remote server computing device 106 is depicted as including self-learning data repository 105, it is contemplated that, in alternate embodiments, mobile device 101 may include one or more portions of self-learning data repository 105, the latter embodied according to computer processor-executable instructions stored within a memory.

A navigation, or positioning, software application downloaded and installed, or stored, in a memory of mobile device 101 may render physical layout map 102 related to a facility or building within a user interface display of mobile device 101. In one embodiment, the navigation software application may incorporate one or more portions the processor-executable instructions manifesting self-learning data repository 105. The terms indoor facility or building as used herein means an at least partially enclosed building having at least one fixed boundary, such as an exterior boundary wall. Display of physical layout map 102 may further show trajectory or route 103 traversed by mobile device 101, which may include an estimated trajectory segment predicted or anticipated for traversal by mobile device 101. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the indoor facility.

Mobile device 101 may include sensor functionality by way of sensor devices. The sensor devices may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices, and measuring a received signal strength, and of determining signal connectivity parameters, related to the ambient wireless signals. In particular, mobile device 101 may include location determination capability such as by way of a GPS module having a GPS receiver, and a communication interface for communicatively coupling to communication network 107, including by sending and receiving cellular data over data and voice channels.

Self-learning data repository 105, also referred to herein as positioning fingerprint data repository 105, may be hosted at server 106, and provided as communicatively accessible to mobile device 101 via communication network 107. In alternate embodiments, positioning fingerprint data repository 105, or any portion(s) thereof, may be stored in a memory of mobile device 101. The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, or anticipated for traversal, by the mobile device. In other words, a fingerprint may include a correlation of sensor and signal information (including, but not necessarily limited to wireless signal strength, magnetic or barometric information, inertial sensor information) associated for a unique location relative to the facility. Thus, fingerprint data associated with a particular location or position provides a signature that uniquely correlates to that particular location or position. Once a particular fingerprint or signature based on any of received wireless communication signal strength and signal connectivity parameters, magnetic field parameters or barometric pressure parameters, and mobile device inertial sensor data is detected or recorded by mobile device 101, the fingerprint as detected may be matched to a reference fingerprint in a fingerprint map of a given facility stored in self-learning data repository 105 to identify a unique position of mobile device 101 relative to the facility, a process also referred to herein as localization. A sequence of positions or locations that constitute a navigation path traversed by the mobile device relative to a given indoor facility may be fingerprint-mapped during a calibration process, and the fingerprint map stored in self-learning data repository 105. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is time-averaged. Fingerprint data may be used to track mobile device 101 traversal along trajectory or route 103 within, and even adjoining, the indoor facility.

In the case of magnetic fingerprint or signature data, the fingerprint may include magnetic field strength and direction data as measured by a magnetometer sensor device of mobile device 101, and may further include magnetic spatial derivative values, derived or calculated from measured magnetic data, including magnetic field strength and magnetic field direction data, for example. Magnetic spatial derivative fingerprint data including magnetic spatial derivative values, and also a pattern of variation of the magnetic spatial derivative values, compiled and stored in a fingerprint map at positioning fingerprint data repository 105 may be used to localize mobile device 101 along respective particular positions of route 103 being traversed.

Figure 2:
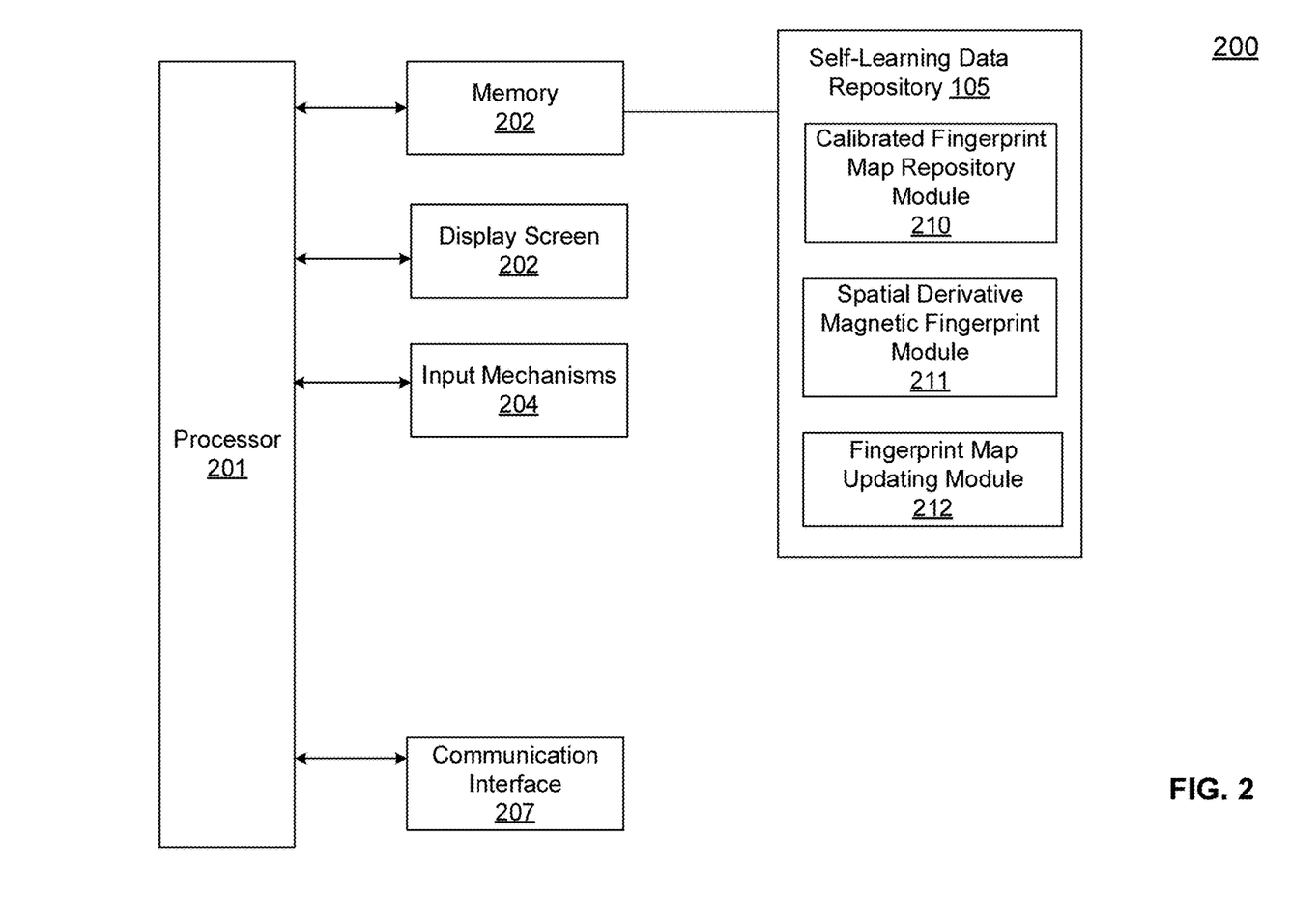
FIG. 2 illustrates, in one example embodiment, an architecture of a a self-learning data repository.

FIG. 2 illustrates an architecture of server 106 hosting self-learning data repository 105, in an example embodiment. Server computing device 106, also referred to herein as server 106, may include processor 201, memory 202, display screen 203, input mechanisms 204 such as a keyboard or software-implemented touchscreen input functionality, and communication interface 207 for communicating via communication network 107.

Self-learning data repository 105 includes instructions stored in memory 202 of server 106. Self-learning data repository 105 may comprise portions or sub-modules including calibrated fingerprint map repository module 210, spatial derivative magnetic fingerprint module 211 and fingerprint map updating module 212.

Processor 201 uses executable instructions of calibrated fingerprint map repository module 210 to store.

Processor 201 uses executable instructions stored in spatial derivative magnetic fingerprint module 211 to derive or calculate, from the mobile device 101 raw or absolute magnetic data measurements such as magnetic field strength, a mobile device spatial derivative magnetic fingerprint for spatial locations or positions along route 103. It is contemplated that, in an alternate embodiment, executable instructions comprising spatial derivative magnetic fingerprint module 211 may instead be resident in a memory of mobile device 101, executable by a processor of mobile device 101 thereon, and communicate mobile device spatial derivative magnetic fingerprint data to self-learning data repository 105 of server 106 during route traversal.

Processor 201 uses executable instructions stored in fingerprint map updating module 212 to access data repository 105 including spatial derivative magnetic fingerprint data associated with respective positions along route 103 and also to localize mobile device 101 based at least partly on matching mobile device 101 spatial derivative magnetic fingerprint with the spatial derivative magnetic fingerprint data of repository 105.

Figure 3:
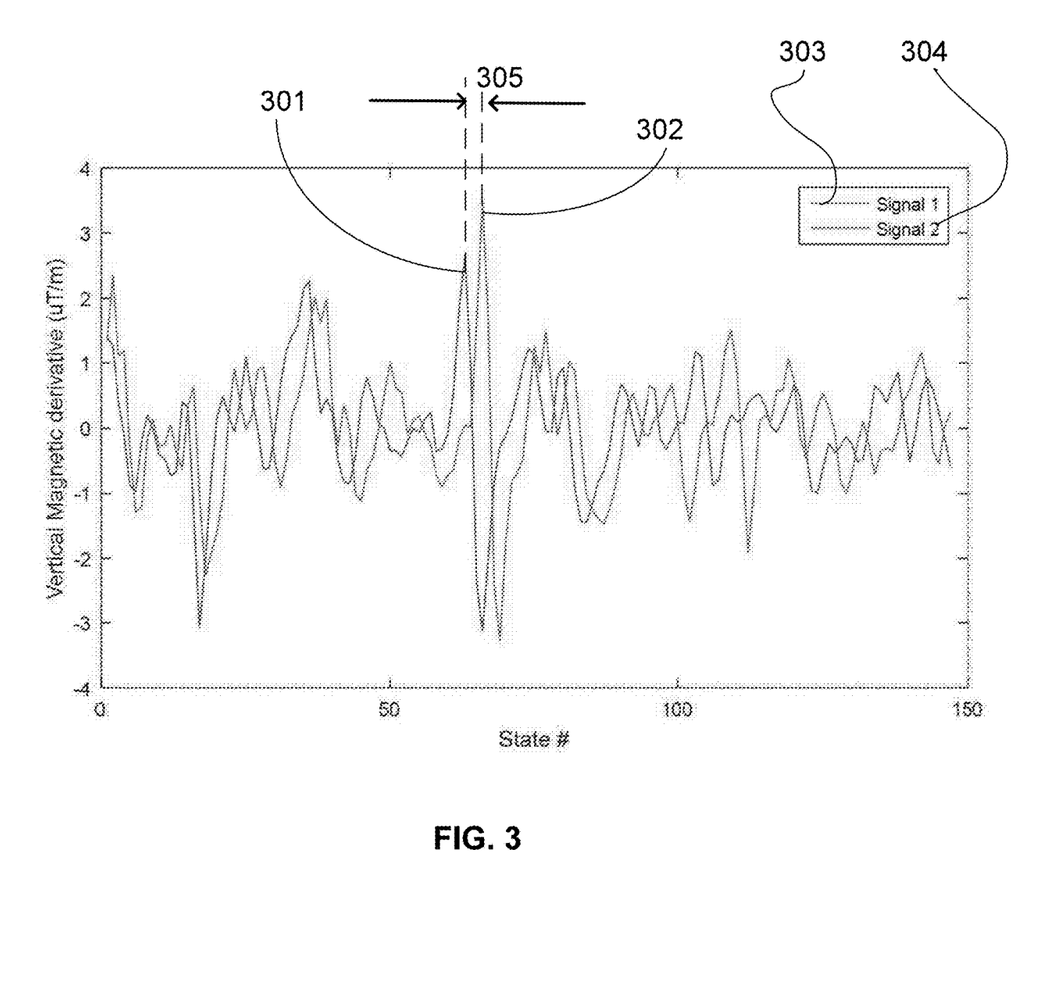
FIG. 3 illustrates magnetic field spatial derivative patterns for a mobile device trajectory and a magnetic fingerprint data repository, in an example embodiment.

FIG. 3 illustrates magnetic field spatial derivative patterns for mobile device 101 trajectory of motion and fingerprint data repository 106, in an example embodiment. While the absolute values of parameters being measured, for example absolute magnetic field strength parameters measured at a given point in space in the facility, might differ in absolute magnitudes, the spatial patterns in variation or trend of the respective absolute measurements provide similar or comparable signatures. The X-axis of FIG. 3 represents a spatial state number, such as a number of steps traversed in step-sized intervals of distance, assuming uniform step sizes, in one embodiment. Magnetic spatial derivative pattern 303 or pattern segment may be derived, using processor 201 of server 106 in one embodiment, for trajectory or route 103 being traversed by mobile device 101.

Still with reference to FIG. 3, a pattern match may be identified between mobile device 101 magnetic spatial derivative data constituting pattern 303 and magnetic spatial derivative fingerprint pattern 304 of self-learning data repository 105 for a corresponding trajectory or trajectory segment. In one embodiment, and a spatial phase shifting may be performed on at least one mobile device magnetic spatial derivative data pattern 303 and magnetic spatial derivative fingerprint data pattern 304 of self-learning data repository 105 for the at least a segment of trajectory 103. The extent of the spatial phase shifting may be calculated to narrow a spatial phase difference 305 between mobile device 101 magnetic spatial derivative data constituting pattern 303 and magnetic spatial derivative fingerprint pattern 304 of self-learning data repository 105. Thus, the spatial phase shifting may narrow the spatial gap between corresponding data points 301, 302 of respective data patterns 303, 304 resulting in increased coincidence thereof in an overlay of the mobile device magnetic spatial derivative data 303 and the magnetic spatial derivative fingerprint data 304 for the segment of the trajectory. In this manner, mobile device 101 magnetic spatial derivative data constituting pattern 303 may be added to magnetic spatial derivative fingerprint pattern 304 of self-learning data repository 105 for a given trajectory 103 segment without adverse consequences from adding unadjusted, out-of-phase magnetic spatial derivative data. In one embodiment, self-learning data repository 105 may be automatically updated by cumulatively adding newer and later-arising magnetic spatial derivative signal data of mobile devices data to the positioning fingerprint data of data repository 105.

In alternate embodiments, the newer and later-arising signal data, including magnetic spatial derivative signal data of mobile devices data may be accorded either a higher or a lower weighting during the updating of already-accumulated or pre-existing positioning fingerprint data of data repository 105. A higher weighting compared to older-acquired mobile devices' fingerprint data may allow for most recent changes related to trajectory 103, such as indoor floorplan infrastructure changes, to be commensurately reflected in updating positioning fingerprint data of data repository 105. A lower weighting compared to older-acquired mobile devices' fingerprint data may allow for designating the older, more mature data as more credible for localizing mobile devices.

Methodology

Figure 4:
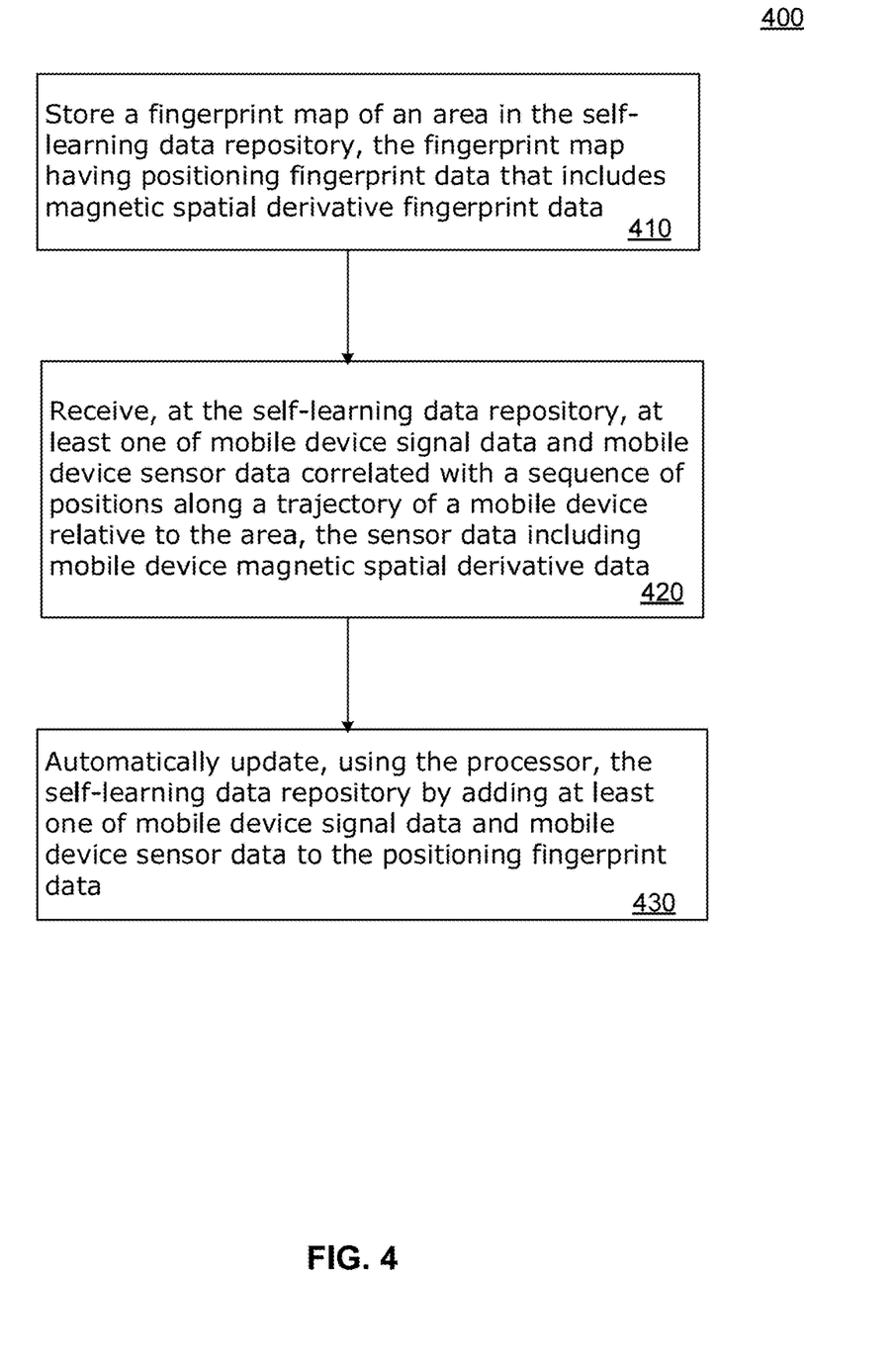
FIG. 4 illustrates, in an example embodiment, a method of updating a self-learning data repository including mobile device fingerprint data.

FIG. 4 illustrates, in an example embodiment, a method of automatically updating self-learning data repository 105 based on mobile device 101 fingerprint data. In describing examples of FIG. 4, reference is made to the examples of FIGS. 1-3 for purposes of illustrating suitable components or elements for performing a step or sub-step being described.

Examples of method steps described herein relate to the use of server 106 for implementing the techniques described. According to one embodiment, the techniques are performed by self-learning data repository 105 of server 106 in response to the processor 201 executing one or more sequences of software logic instructions that constitute self-learning data repository 105. In embodiments, self-learning data repository 105 may include the one or more sequences of instructions within sub-modules including calibrated fingerprint map repository module 210, spatial derivative magnetic fingerprint module 211 and fingerprint map updating module 212. Such instructions may be read into memory 202 from machine-readable medium, such as memory storage devices. In executing the sequences of instructions contained in calibrated fingerprint map repository module 210, spatial derivative magnetic fingerprint module 211 and fingerprint map updating module 212 of self-learning data repository 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between the mobile device 101 and server computing device 106. For example, mobile device 101 may collect and transmit data to server 106 that, in turn, performs at least some portion of the techniques described herein.

At step 410, in storing a fingerprint map of an area in the self-learning data repository, the fingerprint map having positioning fingerprint data that includes magnetic spatial derivative fingerprint data. In embodiments, mobile device 101 magnetic data may include a set of magnetic field measurements, such as but not limited to measurements of magnetic field strength and direction, correlated with sequence of positions along trajectory 103, from which magnetic spatial derivative fingerprint data may be derived.

At step 420, processor 201 executes instructions included in spatial derivative magnetic fingerprint module 211 to receive, at the self-learning data repository 105, at least one of mobile device 101 signal data and mobile device 101 sensor data correlated with a sequence of positions describing a movement of a mobile device along a trajectory within or nearby the area. The sensor data may include magnetic field measurement data, based on which mobile device 101 magnetic spatial derivative data may be derived.

According to an example embodiment for deriving or calculating the magnetic field spatial derivative using processor 201, an average magnetic field value, which may be a magnetic field strength value, associated with a given position or spatial state may calculated based on the absolute magnetic field measurements for at least a pair of given contiguous or adjacent positions. For each adjacent pair of position states, the resulting value will represent the spatial derivative of one state to the next. This operation results in one averaged value per spatial segment for each of the x, y, and z axes in a coordinate system of mobile device 101. Then take the difference between corresponding x, y, and z magnetic field components and calculate the dot product of the differences with the gravity vector ($g^x$, $g^y$, $g^z$). The result would be the difference in vertical component of the magnetic field between two adjacent spatial segments. Finally, the latter difference is divided by the distance between the two spatial segments to derive the spatial derivative. The operation, in this example embodiment, may be summarized in the equation below:

$$\frac{dm^v}{dl} = \frac{g^x(m_2^x - m_1^x) + g^y(m_2^y - m_1^y) + g^z(m_2^z - m_1^z)}{l}$$

In this example embodiment, $$\frac{dm^v}{dl}$$

represents the magnetic spatial derivative for the gravity vector for vertical orientation component of mobile device 101 in the mobile device 101 coordinate system, m represents magnetic field strength as measured, l represents the distance between the adjacent position states, and a represents the gravity vector. In embodiments, mobile device 101 spatial derivative magnetic field data, and spatial derivative magnetic field fingerprint data for repository 105, includes at least one of a horizontal and a vertical magnetic field component values in addition to an absolute magnitude field measurement value.

At step 430, processor 201 executes instructions included in fingerprint map updating module 212 to automatically update, using the processor, the self-learning data repository by adding the at least one of mobile device 101 signal data and mobile device 101 sensor data to the positioning fingerprint data of data repository 105. In embodiments, the fingerprint map data stored in fingerprint data repository 105 (also referred to herein as repository 105) further associates particular positions along route 103 with any combination of fingerprint data, including gyroscope data, accelerometer data, wireless signal strength data, wireless connectivity data, barometric data, acoustic data, line-of sight data, and ambient lighting data, in addition to magnetic data stored thereon.

In embodiments, any portion of data repository 105 may be accessible in a memory of mobile device 101, for instance a portion downloaded thereto. Data repository 105 may also be accessible from server computing device 106 via wireless communication network 107.

In embodiments, mobile device 101 spatial derivative magnetic data establishes a pattern for the set of magnetic field measurements along route 103. Fingerprint map updating module 212 matches the fingerprint pattern with an identified correlating pattern, or a portion of a larger fingerprint pattern, from repository 105 storing the spatial derivative magnetic fingerprint data. Mobile device 101 may be localized by identifying, based on the matching, a position of mobile device 101 among respective positions or locations along route 103 associated with a pattern or trend as indicated by the magnetic spatial derivative data of the fingerprint map accessible at repository 105. In another embodiment, updated data repository 105 may be deployed for localization of additional mobile devices traversing in or near to the indoor area for which a fingerprint map is calibrated.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A method of updating a self-learning data repository, the method executed in a processor of a server computing device and comprising:

storing, in a memory of the server computing device that constitutes the self-learning data repository, a fingerprint map of an indoor facility, the fingerprint map having positioning fingerprint data that includes magnetic spatial derivative fingerprint data;

receiving, from a mobile device, at the self-learning data repository, mobile device sensor data correlated with a sequence of positions describing a movement of the mobile device along a trajectory within the indoor facility, the mobile device sensor data including mobile device magnetic spatial derivative data indicative of relative changes in a magnetic field as the mobile device traverses the sequence of positions;

performing, using the processor, a spatial shifting of at least one of the mobile device magnetic spatial derivative data and the magnetic spatial derivative fingerprint data of the self-learning data repository for at least a segment of the trajectory within the indoor facility to create updated mobile device sensor data, wherein the spatial shifting narrows a spatial phase difference between the mobile device magnetic spatial derivative data and the magnetic spatial derivative fingerprint data; and updating, using the processor, the self-learning data repository by adding the updated mobile device sensor data to the positioning fingerprint data.

2. The method of claim 1 wherein the mobile device spatial derivative magnetic data is derived from a set of magnetic field measurements correlated with the sequence of positions.

3. The method of claim 1 wherein the mobile device spatial derivative magnetic data is derived in accordance with a magnetic spatial gradient based on differences in absolute magnetic field measurements and a spatial separation existing across at least a pair of contiguous positions that indicate the relative changes as the mobile device traverses the sequence of positions.

4. The method of claim 3 wherein performing the spatial shifting comprises compensating for variations in the absolute magnetic measurements of the mobile device by narrowing a spatial gap between corresponding data points of respective mobile device magnetic spatial derivative data and the magnetic spatial derivative fingerprint data.

5. The method of claim 4 wherein the compensating results in an increase in a coincidence in overlay of the mobile device magnetic spatial derivative data and the magnetic spatial derivative fingerprint data.

6. The method of claim 1 wherein the spatial shifting is based on identifying a pattern match between the mobile device magnetic spatial derivative data and the magnetic spatial derivative fingerprint data of the self-learning data repository.

7. The method of claim 1 further comprising localizing a position of the mobile device based on the updating.

8. The method of claim 1 wherein the magnetic spatial derivative data of the self-learning data repository includes at least one of a horizontal and a vertical magnetic field component data.

9. The method of claim 1 further comprising deploying the updated self-learning data repository for localization of mobile devices relative to the area.

10. The method of claim 1 wherein the mobile device is a first mobile device, and further comprising at least a second mobile device, wherein the sensor data including magnetic spatial derivative data of the at least a second mobile device data is accorded one of a higher and a lower weighting compared to a weighting accorded the first mobile device during the updating.

11. A self-learning data repository comprising:
a processor; and
a memory storing a set of instructions, the instructions executable in the processor to:

store, in the memory, a fingerprint map of an indoor facility, the fingerprint map having positioning fingerprint data that includes magnetic spatial derivative fingerprint data;

receive, from a mobile device, at the self-learning data repository, mobile device sensor data correlated with a sequence of positions describing a movement of the mobile device along a trajectory within the indoor facility, the mobile device sensor data including mobile device magnetic spatial derivative data indicative of relative changes in a magnetic field as the mobile device traverses the sequence of positions;

perform, using the processor, a spatial shifting of at least one of the mobile device magnetic spatial derivative data and the magnetic spatial derivative fingerprint data of the self-learning data repository for at least a segment of the trajectory within the indoor facility to create updated mobile device sensor data, wherein the spatial shifting narrows a spatial phase difference between the mobile device magnetic spatial derivative data and the magnetic spatial derivative fingerprint data; and update, using the processor, the self-learning data repository by adding the updated mobile device sensor data to the positioning fingerprint data.

12. The self-learning data repository of claim 11 wherein the mobile device spatial derivative magnetic data is derived from a set of magnetic field measurements correlated with the sequence of positions.

13. The self-learning data repository of claim 11 wherein the mobile device spatial derivative magnetic data is derived in accordance with a magnetic spatial gradient based on differences in absolute magnetic field measurements and a spatial separation existing across at least a pair of contiguous positions that indicate the relative changes as the mobile device traverses the sequence of positions.

14. The self-learning data repository of claim 13 wherein performing the spatial shifting comprises compensating for variations in the absolute magnetic measurements of the mobile device by narrowing a spatial gap between corresponding data points of respective mobile device magnetic spatial derivative data and the magnetic spatial derivative fingerprint data.

15. The self-learning data repository of claim 14 wherein compensating for the variations in the absolute magnetic measurements results in an increase in a coincidence in overlay of the mobile device magnetic spatial derivative data and the magnetic spatial derivative fingerprint data.

16. The self-learning data repository of claim 11 wherein the spatial shifting is based on identifying a pattern match between the mobile device magnetic spatial derivative data and the magnetic spatial derivative fingerprint data of the self-learning data repository.

17. The self-learning data repository of claim 11 further comprising instructions executable in the processor to localize a position of the mobile device based on the updating.

18. The self-learning data repository of claim 11 wherein the magnetic spatial derivative data of the self-learning data repository includes at least one of a horizontal and a vertical magnetic field component data.

19. The self-learning data repository of claim 11 further comprising instructions executable in the processor to deploy the updated self-learning data repository for localization of mobile devices relative to the area.

20. The self-learning data repository of claim 11 wherein the mobile device is a first mobile device, and further comprising at least a second mobile device, wherein the sensor data including magnetic spatial derivative data of the at least a second mobile device data is accorded one of a higher and a lower weighting compared to a weighting accorded the first mobile device during the updating.

* * * * *